United States Patent [19]

Lovik

[11] Patent Number: 4,884,990

[45] Date of Patent: Dec. 5, 1989

[54] LUMINESCENT BALLOON AND METHOD OF MANUFACTURE THEREOF

[76] Inventor: Craig J. Lovik, 8565 Custer School Rd., Custer, Wash. 98240

[21] Appl. No.: 299,310

[22] Filed: Jan. 23, 1989

[51] Int. Cl.$^4$ .................. A63H 3/06; A63H 33/22; B32B 7/02; F21V 9/16

[52] U.S. Cl. ...................... 446/220; 446/219; 428/690; 362/84; 427/157; 250/462.1; 383/3; 383/116

[58] Field of Search ............... 446/219, 220, 226, 175; 273/DIG. 24; 428/9, 11, 12, 690; 250/459.1, 462.1; 362/84; 427/157, 412.1; 383/3, 109, 112, 116

[56] References Cited

U.S. PATENT DOCUMENTS

| | | | |
|---|---|---|---|
| 1,593,703 | 7/1926 | Burr et al. | 446/220 |
| 1,713,751 | 5/1929 | Dorogi et al. | 446/220 X |
| 2,225,307 | 12/1940 | Kreeger | 446/219 X |
| 2,295,708 | 9/1942 | Bitter | 446/220 |
| 2,341,583 | 2/1944 | Tuvr | 250/462.1 |
| 2,382,355 | 8/1945 | Warren | 250/462.1 |
| 2,459,555 | 1/1949 | Tossas | 446/219 |
| 2,646,019 | 7/1953 | Chetlan | 116/210 |
| 3,291,668 | 12/1966 | Goldstein | 428/690 X |
| 3,661,790 | 5/1972 | Dean et al. | 273/DIG. 24 X |
| 3,879,611 | 4/1975 | Schroeder | 250/462.1 |
| 4,586,456 | 5/1986 | Forward | 446/222 X |
| 4,634,395 | 1/1987 | Burchett | 427/230 X |
| 4,759,453 | 7/1988 | Paetzold | 215/100 R X |
| 4,781,647 | 11/1988 | Doane | 446/394 X |

FOREIGN PATENT DOCUMENTS

| | | | |
|---|---|---|---|
| 854768 | 11/1952 | Fed. Rep. of Germany | 446/220 |
| 400068 | 10/1933 | United Kingdom | 427/157 |
| 896904 | 5/1962 | United Kingdom | 446/219 |
| 2030057 | 4/1980 | United Kingdom | 427/157 |
| 2108544 | 5/1983 | United Kingdom | 427/157 |

Primary Examiner—Robert A. Hafer
Assistant Examiner—D. Neal Muir
Attorney, Agent, or Firm—Cassidy & Vance

[57] ABSTRACT

Luminescent balloons (18', 18") and methods of manufacture thereof wherein one or more balloon forms (11) are respectively moved through discrete sequential processing stations (12/16, 14/21 and, optionally, 15/22) for the purpose of applying successive laminations (19, 20 and, optionally, 24) on the balloon forms (11), which laminations are dryed, set and cured in drying stations (16, 21, 22) so as to form a balloon (18', 18") having: (i) an outer lamination (19) formed essentially of pure latex and providing structural integrity for the balloon; (ii) an inner lamination (20) bonded to the inner surface of the outer lamination (19), in which inner lamination (20) the luminescent dry solid particles are maintained in a latex carrier and constitute at least FIFTY PERCENT (50%), and preferably from SIXTY-FIVE PERCENT (65%) to SEVENTY-FIVE PERCENT (75%), of the total dry solids in the inner lamination (20) for imparting the luminescent qualities to the balloon; and (iii), optionally, a third essentially pure latex inner lamination (24) wherein the luminescent lamination (20) is sandwiched between the outer and inner laminations (19 and 20, respectively).

20 Claims, 2 Drawing Sheets

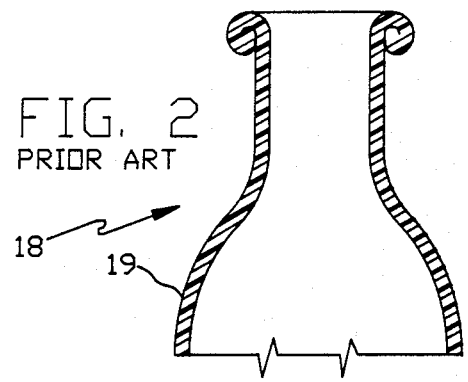
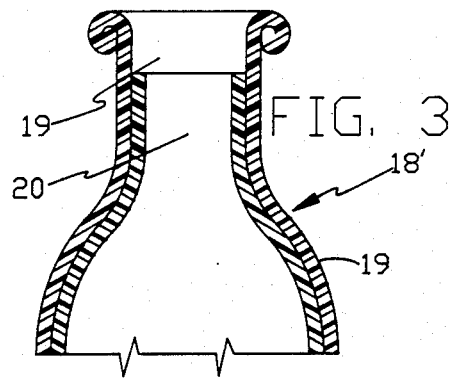
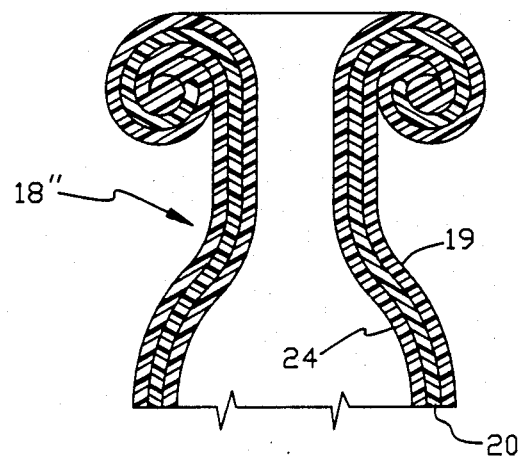

LUMINESCENT BALLOON AND METHOD OF MANUFACTURE THEREOF

BACKGROUND OF THE INVENTION

1. Technical Field

The present invention relates generally to balloons; and, more particularly, to luminescent balloons and methods of manufacture thereof. More specifically, the present invention relates to simple, yet highly effective, methods for making balloons having luminescent characteristics wherein the luminescent mineral particles which are homogeneously distributed throughout conventional latex material defining at least a portion of the conventional inflatable/deflatable resilient balloon sidewall do not serve to destroy and/or denigrate the strength and structural integrity of the balloon and are not susceptible to "flaking off" the balloon when handled and/or when repeatedly inflated and/or deflated.

2. Background Art

There are presently, and for a long time have been, many occasions where people desire to employ luminescent balloons in some form in connection with celebrations such, for example, as birthdays for both children and adults, anniversaries, various types of parties, grand openings, advertisements, promotions, and a wide range of similar celebrations and activities. However, while there has been a long recognized need for such luminescent balloon products, serious and heretofore insurmountable problems have arisen when attempting to fabricate and utilize luminescent balloons.

For example, efforts have been made to apply a coating of luminesent pigment to the surface of conventional balloons in either the inflated or deflated state by such processes as painting, dipping, spraying, or the like. This has not, however, proven successful due to lack of effective adhesion of the mineral pigment particles to the formed latex sidewall of the balloon; and, as a consequence, when the balloon is subsequently inflated and/or deflated, the mineral pigment particles tend to flake off, rapidly reducing the quality of luminescence of the balloon. Moreover, in those instances where the balloon is inflated manually by placing the constricted neck and inflation aperture thereof in the mouth and blowing, there is a tendency for the mineral pigment particles in that area of the balloon to adhere to the moist skin areas of the user's mouth. While such mineral pigment particles are not defined as "toxic materials", nevertheless, the consuming public has resisted usage of such products for this reason alone.

Recognizing the foregoing problems, efforts have been made to mix the luminescent mineral particles directly into the liquid latex solution used to fabricate the balloon in the hope that such particles will be integrally bonded into the latex balloon sidewall as contrasted with simply being applied to the surface thereof. Again, such efforts have proven totally unsatisfactory due to the fact that even minimal quantities of mineral pigment particle solids in the latex have tended to severely weaken the latex and to thereby destroy the balloon's structural integrity, resulting in bursting of the balloon when efforts are made to inflate it. This problem is quickly exacerbated when the manufacturer attempts to increase the mineral pigment solids content of the latex solution to levels approaching FORTY PERCENT (40%) to FIFTY PERCENT (50%), or more, of total solids in the latex solution—pigment levels that are absolutely essential to produce a balloon whose luminescent brightness and staying or persistence characteristics are even minimally satisfactory.

The long standing need for a satisfactory luminescent balloon is, perhaps, best evidenced by reference to U.S. Pat. No. 2,646,019-Chetlan which issued in 1953—viz., more than thirty-five (35) years ago—on an application filed in 1951. Thus, Chetlan discloses a signal balloon assembly intended for life saving purposes—a device which includes an otherwise conventionally shaped balloon designated at "38" in the drawings and specification. Chetlan states at Col. 3, lines 52-58: " . . . Considering the balloon member be of a flourescent or luminous material, so formation of the balloon member 38, I prefer that the balloon member be of a florescent or luminous material, so as to glow in darkness. Further, it is preferred that the balloon member contain iron oxide or some other suitable material which can be detected by radar or the like . . . ". The foregoing constitutes essentially the only public disclosure of which the present inventor is aware dealing with any effort to form a luminescent balloon; and, as previously stated, it has proven technically unfeasible as evidenced by the fact that such life saving signal balloons have not been available with luminescent characteristics despite the dire need therefor. Rather, such "signal balloons" as have been commercially available have been formed of non-resilient, non-latex material—e.g., Mylar—having highly visible colored surfaces and/or reflective surfaces for permitting both visual and radar detection. This, of course, has been directly attributable to the fact that were Chetlan to have painted, sprayed or otherwise coated the balloon member "38" with luminous material, it would have tended to flake off the balloon when inflated and/or wash off when subjected to inclement weather, spray and/or other moisture; and, had Chetlan attempted to incorporate the luminous pigment particles in the latex solution during formation of the balloon member "38", the resulting product would not have possessed sufficient strength and/or structural integrity to permit inflation.

Luminescent mineral particles have, of course, been effectively applied as coatings on and/or in other types of products which are not inflatable but, rather, are of structurally rigid self-supporting construction. A typical example of such a product is that disclosed in U.S. Pat. No. 2,459,555-Tossas wherein rigid, plastic, transparent, hemispherically-shaped elements have a coating of luminescent paint or the like applied thereon so that upon assembly a luminescent maraca is formed. Again, the inherent characteristic of flaking of the luminescent material is clearly recognized by Tossas at Col. 2, lines 11 through 14 where the patentee states: " . . . Upon such shaking the particles 10 (small balls or the like) will take up some of the luminous paint and will themselves—after some shaking—become luminous . . . ".

Other patents of purely incidental interest include U.S. Pat. Nos. 1,593,703-Morr et al. and 2,295,708-Bitter. Thus, Morr et al. disclose a method of manufacturing a colored balloon wherein the desired color pigments, which do not include luminescent mineral particles—are applied to the surface of the balloon being formed prior to setting and curing. Consequently, the color becomes integral with the balloon as contrasted with being painted on the surface. This technique has not, however, proven suitable for use with luminescent mineral pigment particles for the reasons previously stated—viz., the inclusion of such mineral particles in the latex material serves to denigrate the structural integrity thereof; and, if added in quantity sufficient to provide even minimal levels of luminescence, will result in a balloon that will burst when one attempts to inflate it.

The aforesaid Bitter patent is of interest merely for its disclosure of a typical double dipping process that has occasionally been used to make balloons, albeit that no luminescent materials are suggested or disclosed. Thus, Bitter provides a first completely normal dip operation to form an outer latex layer for the balloon sidewall. After the latex material has been cured and set, the balloon form with the cured set latex film thereon is again dipped into a liquid latex solution which, while still wet, is immersed in a " . . . crinkling or wrinkling solution . . . " such as ethylene dichloride or other rubber solvent or acid solvent so as to produce a textured or figured pattern on the outer lamination of the balloon when the balloon is stripped from the form.

However, apart from the suggestion in the aforesaid Chetlan patent that luminescent balloon be formed—a suggestion which, prior to the advent of the present invention—has not been capable of achievement on a production basis—none of the other prior art of which the present inventor is aware has disclosed or suggested either a viable process for making luminescent balloons on an economic basis or an acceptable and usable luminescent balloon.

SUMMARY OF THE INVENTION

The present invention overcomes all of the foregoing disadvantages by providing a simple, effective and relatively economic process for incorporating non-toxic luminescent mineral pigment particles into the latex sidewall of an otherwise conventional latex balloon without destroying or denegrating the balloon's structural integrity; yet, wherein the luminescent mineral pigment particles can comprise up to, and even in excess of, on the order of from about SIXTY-FIVE PERCENT (65%) to about SEVENTY-FIVE PERCENT (75%) of the total weight of dry solids used in the latex solution. To this end, the luminescent balloons of the present invention are formed of multiple latex laminations in a multiple or sequential dipping process. For example, in one form of the invention, balloon forms are immersed into a completely conventional latex solution to form a first, or outer, balloon sidewall lamination of a desired thickness suitable to provide an inflatable balloon having the desired strength characteristics to resist bursting when inflated up to the intended and desired size. That is, the first dipping operation serves to produce a conventional balloon having all of the necessary strength and structural integrity characteristics that are desired. After curing and setting, the balloon forms with the first latex lamination thereon are then subjected to a second dipping operation in a latex solution having luminescent mineral pigment particles— preferably, zinc sulfide—added thereto where the luminescent mineral pigment particles preferably comprise on the order of about SIXTY-FIVE PERCENT (65%) to SEVENTY-FIVE PERCENT (75%) of total dry solids in the solution and, in any event, generally in excess of FIFTY PERCENT (50%) of total dry solids in the solution. Thus, during the second dipping operation a second, substantially homogeneous, latex/luminescent particle layer or lamination is formed which, while having little or no structural integrity of and by itself, is bonded to the first structural latex lamination so as to form a luminescent balloon which, when peeled from the balloon former and turned inside out, has a smooth inflatable resilient outer latex sidewall providing essentially all of the balloon's structural integrity and a second inner latex/luminescent pigment lamination providing all of the desired luminescent characteristics of the composite laminar balloon. If desired, the balloon can be subjected to a third dipping operation in a conventional latex solution after curing and setting of the second luminescent lamination so as to sandwich the luminescent lamination between outer and inner layers of essentially pure latex which, together, can be dimensioned in terms of thickness, etc., to provide structural integrity for the balloon.

Those skilled in the art will appreciate as the ensuing description proceeds that the particular order in which the laminations are formed is not critical to the present invention, although it is desirable that the particular sidewall lamination containing the luminescent particles be other than the outer lamination of a finished product. Thus, in one of the exemplary forms of the invention hereinafter described, the first lamination applied to the balloon form is essentially pure latex while the second contains luminescent particles in the latex, thus necessitating that the balloon be turned inside out when removed from the balloon form. Alternatively, it is within the scope of the invention as expressed in the appended claims to reverse the order of deposit of the two (2) laminations, in which event the balloons need not be turned inside out. And, of course, where the luminescent lamination is sandwiched between two (2) essentially pure latex laminations, it is irrelevant as to whether the balloons are turned inside out.

DESCRIPTION OF THE DRAWINGS

These and other objects and advantages of the present invention will become more readily apparent upon reading the following Detailed Description and upon reference to the attached drawings, in which:

FIG. 2 is a highly diagramatic, fragmentary, vertical sectional view taken through a conventional balloon sidewall of the type having a single essentially pure latex lamination—i.e., the product resulting from a single conventional dipping operation after curing, setting, stripping from the balloon form;

FIG. 3 is a highly diagramatic, fragmentary, vertical sectional view similar to that shown in FIG. 2, but here illustrating a portion of a luminescent balloon formed in accordance with the present invention and having a first outer essentially pure latex layer providing the balloon's structural integrity and a second inner layer containing on the order of FIFTY-PERCENT (50%) or more, and preferably SIXTY-FIVE PERCENT (65%) to SEVENTY-FIVE PERCENT (75%), luminous mineral pigment particles, by weight, of total dry solids with the balance being latex; and, FIG. 4 is a highly diagramatic, fragmentary vertical sectional view similar to FIGS. 2 and 3, but here illustrating a modified form of the invention wherein three (3) sequential dipping operations are provided to form an inflatable balloon sidewall having outer and inner essentially pure latex laminations providing structural integrity for the balloon and an intermediate latex/luminescent mineral pigment lamination sandwiched therebetween to provide the balloon's luminescent characteristics.

Figure 1:
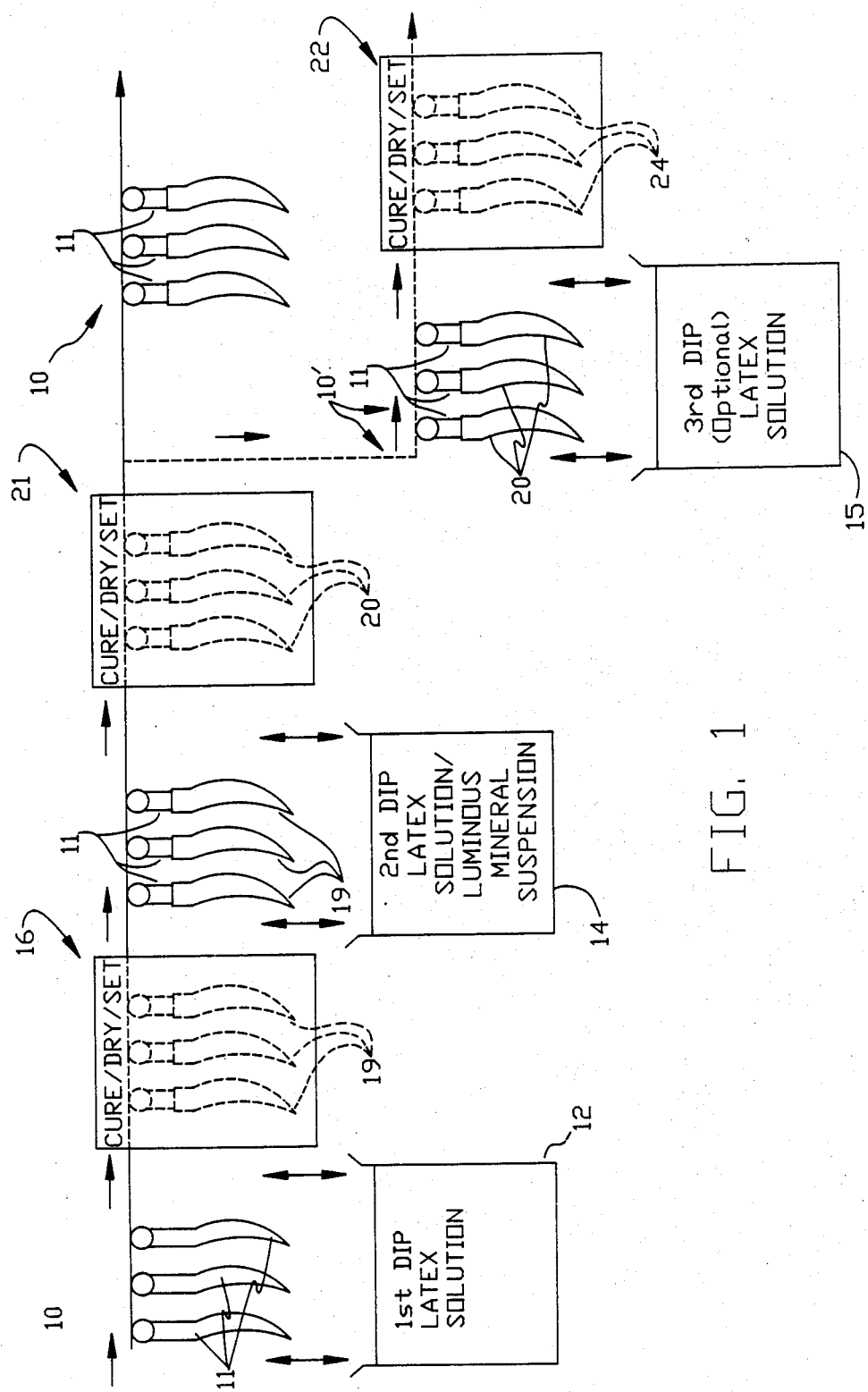
FIG. 1 is a highly diagramatic block-and-line drawing illustrative of a typical set of operations employed in forming luminescent balloons in accordance with one exemplary embodiment of the present invention.

While the invention is susceptible of various modifications and alternative forms, specific embodiments thereof have been shown by way of example in the drawings and will herein be described in detail. It should be understood, however, that it is not intended to limit the invention to the particular forms disclosed but, on the contrary, the intention is to cover all modifications, equivalents and/or alternatives falling within the spirit and scope of the invention as expressed in the appended claims.

DETAILED DESCRIPTION

Turning now to the drawings, and as best illustrated in FIG. 1, an exemplary process for forming luminescent balloons in accordance with the present invention has been disclosed in highly diagramatic block-and-line form. Those skilled in the art will appreciate as the ensuing description proceeds, that the production line illustrated diagramatically will be composed of completely conventional conveyors, dip tanks, dryers, balloon forms and actuating mechanisms for moving the forms through different successive processing stations in sequential order and for lowering and/or raising the balloon forms and/or the tanks of latex and latex/luminescent mineral solutions so as to permit dipping of the forms in the respective solutions. Moreover, conventional balloon manufacturing processes will commonly include apparatus for applying a talcless coagulant to the balloon forms during the manufacturing process, a step which has not been illustrated in the drawings but which is well known to persons skilled in the art and may be employed with the invention if necessary and/or desired. Such conventional apparatus forms no part of the present invention except in process terms as required to form an inflatable balloon having a resilient latex sidewall composed of two (2) or more discrete laminations bonded together wherein the outer lamination is essentially pure latex material providing the balloon's strutural integrity and an inner lamination is provided in which the majority of dry solids comprising such lamination constitute luminous mineral pigment particles homogeneously distributed throughout a latex carrier for providing the balloon's luminescent characteristics, but which lamination does not contribute significantly to structural integrity. Moreover, those skilled in the art will appreciate that other manufacturing techniques can be employed for forming balloons embodying the features of the present invention provided only that such techniques are capable of forming a resilient inflatable balloon sidewall having two (2) or more discrete laminations—i.e., an outer latex lamination providing structural integrity, and an inner lamination bonded thereto providing the luminescent qualities.

Thus, in carrying out the invention utilizing the conventional apparatus depicted diagramatically in FIG. 1, a conventional conveyor, generally indicated at 10, is provided for supporting a plurality of conventional balloon forms 11—which are commonly spoon-shaped and formed of smooth ceramic material—with freedom for movement to and through successive process stations in sequential order and with freedom for permitting relative movement between the balloon forms 11 and two (2) or more tanks 12, 14, 15 containing a desired latex dip solution. In keeping with this aspect of the invention, the tank 12 preferably contains a conventional latex solution containing latex and water. Although not shown in the highly diagramatic system depicted in FIG. 1, those skilled in the art will appreciate that provisions can be made for continuously replacing the latex solution in tank 12 and, if desired, suitable and completely conventional mixing apparatus can be provided for continuously circulating the liquid latex material so as to minimize adhesion to the tank sidewall and/or precipitation of undissolved solids. Moreover, although not shown in the drawings, other completely conventional apparatus can be provided for permitting relative movement between the latex solutions in tank 12 and the balloon forms 11 so that the forms can be momentarily dipped into the solution to permit formation of a latex film on the forms.

After dipping of the balloon forms 11 in the latex solution in tank 12, the dipped forms having a latex film formed thereon are relatively moved into and through a conventional drying station, generally indicated at 16 in FIG. 1, where the latex film on the forms 11 is dried, set and cured in a completely conventional manner. Thus, were the balloons thus formed simply stripped from the forms 11 after exiting the drying station 16, the resulting product would be a completely conventional balloon, such as that generally indicated at 18 in FIG. 2, having a single resilient inflatable sidewall lamination 19 formed of essentially pure latex material.

In keeping with the important aspects of the present invention, rather than striping the cured, dried and set latex balloon sidewall lamination 19 from the forms 11 after exiting the drying station 16, the forms 11 with the cured at least partially set latex lamination 19 are moved relative to a second latex solution contained in tank 14 so as to form a second lamination or film in face-to-face contact with the film 19. However, in this instance the latex solution contained within tank 14, rather than being an essentially pure latex/water solution, contains a mixture of latex and water in solution and a plurality of luminescent mineral pigment particles suspended within the solution and comprising in excess of FIFTY PERCENT (50%) of the total dry solids dissolved and/or suspended in solution and preferably, comprising from SIXTY-FIVE PERCENT (65%) to SEVENTY-FIVE PERCENT (75%), by weight, of total dry solids dissolved and/or suspended in solution.

Preferably the luminescent mineral pigment solids comprise zinc sulfide and, most preferably, comprise a phosphorescent pigment grade marketed by United Mineral and Chemical Corp. of Lyndhurst, N.J. under the product designation "6SSU". Particularly excellent results have been obtained when using this particular luminescent material for a number of reasons including: (i) the material is a relatively pure grade of zinc sulfide; (ii) the fact that the material is believed to glow up to three (3) times more brightly than standard grades of zinc sulfide given the same exposure to a suitable light source; (iii) the persistence of luminescence—i.e., the time period during which the material glows when removed from an actuating light source—is considerably longer than standard grades of zinc sulfide; and (iv), such material is considerably finer—i.e., smaller in particle size—than standard grades of zinc sulfide. This last factor provides two (2) very important advantages—first, because the particles are so fine, it is easier to maintain them in a substantially homogeneous suspension within the liquid latex carrier, it being understood by those persons skilled in the art that for all practical purposes zinc sulfide is essentially insoluble in water and, therefore, coarser grains tend to settle or precipitate out of the latex solution within tank 14 in the absence of excessive mechanical agitation of the solution which, in turn, tends to aerate the solution and thus further denigrate the structural characteristics of the lamination produced. Secondly, because the particle size of phosphorescent material in type "6SSU" zinc sulfide is so fine, the particles tend to be more evenly distributed throughout the latex carrier and thus tend to minimize the decrease in structural integrity of the luminescent lamination produced.

In carrying out the invention, when the balloon forms 11 having the cured, set and dried outer balloon lamination 19 formed thereon are immersed in the latex solution/luminescent particle suspension contained within tank 14, a second lamination or film 20, best indicated in FIG. 3 after the balloon generally designated at 18' is stripped from the form 11 and turned inside out, is formed in face-to-face bonded contact with lamination 19. Thereafter, the forms 11 are removed from tank 14 and passed into a second drying station, generally indicated at 21 in FIG. 1 where the outermost exposed wet film 20 is dried, set and cured in intimate face-to-face bonded contact with the previously deposited inner and essentially pure latex lamination 19. Consequently, when the composite films 19, 20 are stripped from the balloon forms 11 and turned inside out, a luminescent balloon 18' is formed having an outer, smooth, essentially pure latex lamination 19 imparting structural strength to the balloon and an inner luminescent lamination 20 containing in excess of FIFTY PERCENT (50%), and preferably about SIXTY-FIVE PERCENT (65%) to about SEVENTY-FIVE PERCENT (75%), by weight, of total dry solids with the balance of solids present comprising latex.

It has been found that when adding phosphorescent dry solids to the latex carrier, even when utilizing United Mineral's "6SSU" grade zinc sulfide, adding less than FIFTY PERCENT (50%), by weight, of total dry solids tends to produce a balloon which, while it will luminesce, is not generally as bright as desired and where the persistence of luminescence is generally unsatisfactory. On the other hand, when adding dry luminescent solids greater than about SEVENTY-FIVE PERCENT (75%), by weight, of total solids, it has been found that the luminescence of the resulting balloon, while equally or more persistent, tends to be less bright. This is believed to be directly attributable to the fact that an inflated balloon is essentially a three dimensional, somewhat transparent object; and, when using in the range of about FIFTY PERCENT (50%) to about SEVENTY-FIVE PERCENT (75%) luminescent particles, by weight, of total dry solids, both the sidewall of the balloon closest to the observer and that most remote from the observer contribute to the luminescent effect—that is, the luminescent sidewall remote from the observer tends to provide a backlighting effect. On the other hand, when the percentage of luminescent solids by weight begins to exceed about SEVENTY-FIVE PERCENT (75%) of total dry solids, the balloon sidewall becomes more opaque and the luminescent portion closest to the observer serves to mask the backlighting effect to a degree greater than it contributes to brightness. Moreover, when excess amounts of luminescent dry solid particles are added to the latex carrier in tank 14, the resulting solution becomes extremely thick, making it difficult to dip and impeding mechanical agitation of the solution.

While the relatively fine luminescent particles present in United Mineral's "6SSU" grade of zinc sulfide enhance homogeneous distribution of the luminescent particles throughout the liquid latex carrier, it has been found that mild agitation of the liquid mix and suspension utilizing conventional mixing equipment (not shown) is desirable. Indeed, in some instances it has been found desirable to employ a conventional bottom crawler/scraper (not shown) within tank 14 so as to prevent excess precipitation and/or settling of the substantially insoluble luminescent particles from suspension.

While it has been found that balloons 18' (FIG. 3) having only two (2) laminations 19, 20 as described aforesaid, are highly effective, strong and completely satisfactory for most purposes, those persons skilled in the balloon art will appreciate that there has been an ever increasing tendency to utilize balloons as carriers, or envelopes, for small gifts, stuffed animals, flowers and similar favors which are stuffed into the balloon. In this instance, it may be desirable to form a third essentially pure latex lamination on the balloon so as to prevent direct contact between such objects and the luminescent lamination 20. To accomplish this, it is merely necessary to pass the balloon forms 11 exiting from drying station 21 (FIG. 1) and having their composite cured laminations 19, 20 thereon over an optional conveyor, generally indicated in broken lines at 10', to a third dip station defined by tank 15 containing an essentially pure latex solution therein. Thus, dipping of the balloon forms 11 into tank 15 and subsequent curing thereof in an additional drying station, generally indicated at 22 in FIG. 1, serves to produce a balloon 18" such as that shown in FIG. 4 having two (2) essentially pure latex laminations 19 and 24, respectively, and an intermediate luminescent lamination 20 sandwiched therebetween. Thus, the inner essentially pure latex lamination—here, lamination 24—serves to prevent objects stuffed into the balloon 18" from contacting the luminescent particles in lamination 20 and causing the latter to flake or rub off in the manner described in the aforesaid Tossas U.S. Pat. No. 2,459,555. Moreover, even though zinc sulfide is classified as a "non-toxic" material, those persons having reservations about placing the balloon 18' of FIG. 3 in their mouth for purposes of inflation, should have no such reservations about inflating balloon 18" where the luminescent particles are totally enclosed between two (2) essentially pure latex laminations.

It has been found that exceedingly pleasing and desirable aesthetic effects can be obtained by printing messages, designs and the like upon balloons formed in accordance with the present invention such as those shown at 18' and 18" in FIGS. 3 and 4 utilizing an opaque ink or other opaque printing medium. Thus, messages such as "Happy Birthday", "Congratulations Grad", or the like, can be printed on the outer surface of lamination 19 in a completely conventional manner; and, when the inflated luminescent balloon 18', 18" is removed from an activating light source and placed in a dark environment, the graphics, messages or other opaque printed messages obscure the underlying luminescent particles and provide a balloon having visible messages and/or other designs backlighted by the unobscured luminescent portion of the balloon. Such an arrangement permits personalization of balloons for parties; and, can also be used for advertising and/or promotional purposes.

While those skilled in the art will appreciate that there have herein been described processes for forming luminescent balloons which are luminescent throughout essentially the entire inflated exposed sidewall, it will be understood that other arrangements are possible. For example, during the second dipping operation the balloon forms 11 may be inserted only partially into tank 14 so as to form a balloon having only a portion of its sidewall luminescent. Indeed, it is believed possible to coat selected portions of the lamination 19 on the balloon form 11 prior to dipping into the tank 14 with materials which preclude deposition of the latex carrier, thereby permitting various decorative luminescent effects.

I claim:

1. The method of fabricating a luminescent balloon comprising the steps of:
   (a) sequentially forming first and second contiguous sidewall laminations bonded to one another in face-to-face relation wherein one of the first and second sidewall laminations consists essentially of pure latex and defines the outer lamination of the balloon and the other of the first and second sidewall laminations comprises a latex lamination having luminescent mineral pigment particles distributed substantially homogeneously throughout the other lamination and defines the inner lamination of the balloon; and,
   (b) sequentially drying, setting and curing the first and second sidewall laminations following formation of each lamination so as to form a cured composite laminated balloon sidewall having an outer lamination formed of essentially pure latex material providing structural integrity and an inner contiguous lamination providing luminescent characteristics.

2. The method of fabricating a luminescent balloon comprising the steps of:
   (a) forming a resilient inflatable balloon having a first sidewall lamination consisting essentially of latex;
   (b) drying and setting the first sidewall lamination;
   (c) forming a second resilient inflatable sidewall lamination in situ on the outer exposed surface of the first sidewall lamination utilizing a liquid solution containing water and a latex carrier dissolved therein, and a suspension of luminescent mineral pigment particles distributed substantially homogeneously throughout the solution;
   (d) drying, setting and curing the composite, laminated, resilient, inflatable balloon sidewall; and,
   (e) turning the cured composite laminated balloon sidewall inside out so that the outermost exposed lamination comprises the first lamination consisting essentially of latex and the inner second lamination comprises a latex carrier and luminescent particles distributed substantially homogeneously throughout the latex carrier.

3. The method as set forth in claims 1 or 2 wherein the luminescent mineral pigment particles comprise zinc sulfide.

4. The method as set forth in claims 1 or 2 wherein the luminescent mineral pigment particles comprise in excess of FIFTY PERCENT (50%), by weight, of the total dry solids contained within the liquid solution.

5. The method as set forth in claims 1 or 2 wherein the luminescent mineral pigment particles comprise in the range of from about SIXTY-FIVE PERCENT (65%) to about SEVENTY-FIVE PERCENT (75%), by weight, of the total dry solids contained within the liquid solution.

6. The luminescent balloon product produced by the method set forth in claims 1 or 2.

7. The luminescent balloon product produced by the method set forth in claim 4.

8. The luminescent balloon product produced by the method set forth in claim 5.

9. The method of fabricating a luminescent balloon comprising the steps of:
   (a) forming a resilient inflatable balloon having a first sidewall lamination consisting essentially of latex;
   (b) drying and setting the first sidewall lamination;
   (c) forming a second resilient inflatable sidewall lamination in situ on the outer exposed surface of the first sidewall lamination utilizing a liquid solution containing water and a latex carrier dissolved therein, and a suspension of luminescent mineral pigment particles distributed substantially homogeneously throughout the solution;
   (d) drying and setting the second resilient inflatable sidewall lamination;
   (e) forming a third resilient inflatable sidewall lamination essentially of latex in situ on the outer exposed surface of the second sidewall lamination; and,
   (f) drying, setting and curing the composite laminar resilient inflatable balloon sidewall so that the outermost exposed lamination and the innermost exposed lamination, respectively, consist essentially of latex with the second sidewall lamination consisting of a latex carrier and luminescent particles distributed substantially homogeneously throughout the latex carrier being sandwiched between the first and third sidewall laminations.

10. The method as set forth in claim 9 wherein the luminescent mineral pigment particles comprise zinc sulfide.

11. The method as set forth in claims 9 or 10 wherein the luminescent mineral pigment particles comprise in excess of FIFTY PERCENT (50%), by weight, of the total dry solids contained within the liquid solution.

12. The method as set forth in claims 9 or 10 wherein the luminescent mineral pigment particles comprise in the range of from about SIXTY-FIVE PERCENT (65%) to about SEVENTY-FIVE PERCENT (75%), by weight, of the total dry solids contained within the liquid solution.

13. The luminescent balloon product produced by the method set forth in claims 9 or 10.

14. The luminescent balloon product produced by the method set forth in claim 11.

15. The luminescent balloon product produced by the method set forth in claim 12.

16. A luminescent balloon comprising, in combination:
   (a) a first resilient inflatable outer sidewall lamination formed essentially of latex and providing structural integrity for said balloon; and,
   (b) a second resilient inflatable inner sidewall lamination formed of:
      (i) a latex carrier; and,
      (ii) luminescent mineral pigment particles distributed substantially homogeneously throughout said latex carrier, said second inner sidewall lamination being in face-to-face bonded contact with said first outer sidewall lamination.

17. A luminescent balloon as set forth in claim 16 wherein said luminescent mineral pigment particles comprise zinc sulfide.

18. A luminescent balloon as set forth in claim 16 further including a third resilient inflatable inner sidewall lamination formed essentially of latex deposited on the inner surface of said second inner sidewall lamination with said second inner sidewall lamination being sandwiched between said first outer sidewall lamination and said third inner sidewall lamination.

19. A luminescent balloon as set forth in claims 16, 17 or 18 wherein said luminescent mineral pigment particles comprise in excess of FIFTY PERCENT (50%), by weight, of the total dry solids contained in said second inner sidewall lamination.

20. A luminescent balloon as set forth in claims 16, 17 or 18 wherein said luminescent mineral pigment particles comprise in the range of from about SIXTY-FIVE PERCENT (65%) to about SEVENTY-FIVE PERCENT (75%), by weight, of the total dry solids contained within said second inner sidewall lamination.

* * * * *